(12) United States Patent
Tognoli, Jr.

(10) Patent No.: US 11,549,255 B2
(45) Date of Patent: Jan. 10, 2023

(54) SYSTEM USING STRUTS AND HUBS FOR AN ELONGATED GEODESIC DOME WITH AN ARCHED-TUNNEL SECTION

(71) Applicant: VivaGrow Systems, Inc., Oceanside, CA (US)

(72) Inventor: Joseph William Tognoli, Jr., Oceanside, CA (US)

(73) Assignee: VivaGrow Systems, Inc., Oceanside, CA (US)

( * ) Notice: Subject to any disclaimer, the term of this patent is extended or adjusted under 35 U.S.C. 154(b) by 0 days.

(21) Appl. No.: 16/903,532

(22) Filed: Jun. 17, 2020

(65) Prior Publication Data

US 2020/0399888 A1  Dec. 24, 2020

Related U.S. Application Data

(63) Continuation-in-part of application No. 29/695,654, filed on Jun. 20, 2019, now Pat. No. Des. 939,728.
(Continued)

(51) Int. Cl.
*E04B 1/32* (2006.01)
*E04B 1/58* (2006.01)
(Continued)

(52) U.S. Cl.
CPC .................. *E04B 1/32* (2013.01); *A01G 9/14* (2013.01); *E04B 1/40* (2013.01); *E04B 1/58* (2013.01);
(Continued)

(58) Field of Classification Search
None
See application file for complete search history.

(56) References Cited

U.S. PATENT DOCUMENTS

| D171,889 S | 4/1954 | Graham |
| 2,934,075 A | 4/1960 | Richardson |

(Continued)

FOREIGN PATENT DOCUMENTS

CN         108149946 A  *  6/2018  ............... E04B 1/58

OTHER PUBLICATIONS

Campo, Joseph Martin, U.S. Appl. No. 62/286,825, filed Jan. 25, 2016, Specification, 1 page.
(Continued)

*Primary Examiner* — Babajide A Demuren
(74) *Attorney, Agent, or Firm* — Carr & Ferrell LLP (57) ABSTRACT

The disclosure is directed to an elongated geodesic dome with an arched-tunnel section. In some embodiments including: a first adjustable angle hub connector, the first adjustable angle hub connector being a connector of a first plurality of tubular struts, the first plurality of tubular struts being inserted into the first adjustable angle hub connector; a second adjustable angle hub connector, the second adjustable angle hub connector being a connector of a second plurality of tubular struts, the second plurality of tubular struts being inserted into the second adjustable angle hub connector; a third adjustable angle hub connector, the third adjustable angle hub connector being a connector of a third plurality of tubular struts, the third plurality of tubular struts being inserted into the third adjustable angle hub connector. The adjustable angle hub connectors may be removable for adjusting a length of the arched-tunnel section of the elongated geodesic dome.

20 Claims, 12 Drawing Sheets

Related U.S. Application Data (60) Provisional application No. 62/864,321, filed on Jun. 20, 2019.

(51) Int. Cl.
*E04B 1/41* (2006.01)
*A01G 9/14* (2006.01)

(52) U.S. Cl.
CPC .............. *E04B 2001/3241* (2013.01); *E04B 2001/3252* (2013.01); *E04B 2001/5887* (2013.01)

(56) References Cited

U.S. PATENT DOCUMENTS

| | | | |
|---|---|---|---|
| 3,137,371 A * | 6/1964 | Nye | E04B 1/3211 52/81.2 |
| 3,186,524 A | 6/1965 | Spaeth | |
| 3,220,152 A * | 11/1965 | Sturm | E04B 1/19 52/655.2 |
| 3,359,694 A * | 12/1967 | Hein | E04B 1/3211 52/81.2 |
| 3,464,168 A | 9/1969 | Russell | |
| 3,496,686 A | 2/1970 | Bird | |
| D219,773 S | 1/1971 | Notaro | |
| 3,710,806 A * | 1/1973 | Kelly | E04B 1/3441 135/145 |
| 3,839,832 A | 10/1974 | Kastner | |
| D235,434 S | 6/1975 | Hemmelsbach | |
| 3,889,433 A | 6/1975 | Eubank | |
| 4,009,543 A * | 3/1977 | Smrt | E04B 1/3211 52/81.2 |
| 4,187,613 A * | 2/1980 | Ivers | G01B 3/14 33/32.1 |
| D257,493 S | 11/1980 | Lodrick | |
| 4,491,437 A * | 1/1985 | Schwartz | E04B 1/3211 403/172 |
| D280,665 S | 9/1985 | Miller | |
| 4,542,759 A * | 9/1985 | Kyner, Jr. | E04B 1/3211 135/122 |
| 4,569,165 A * | 2/1986 | Baker | B29C 66/7394 52/81.3 |
| 4,589,236 A * | 5/1986 | McAllister | E04B 1/3211 403/174 |
| 4,703,594 A * | 11/1987 | Reber | E04B 1/3211 403/172 |
| 4,729,197 A * | 3/1988 | Miller | E04B 1/3211 403/172 |
| 4,765,103 A | 8/1988 | Clarke | |
| 4,773,191 A | 9/1988 | Slack | |
| 4,953,329 A * | 9/1990 | Frantl | E04B 1/3205 52/80.1 |
| 6,108,984 A * | 8/2000 | Davidson | E04B 1/3211 403/171 |
| 6,887,009 B1* | 5/2005 | Lopez | E04B 1/19 403/171 |
| 6,996,942 B2* | 2/2006 | Geiger | E04B 1/3211 446/116 |
| 7,464,503 B2* | 12/2008 | Hoberman | A63H 31/00 52/645 |
| 7,921,613 B2* | 4/2011 | Nii | E02D 5/76 52/169.1 |
| 8,863,447 B2* | 10/2014 | Bischoff | E04B 1/3211 52/81.1 |
| D774,208 S | 12/2016 | Kasanen | |
| 9,650,805 B2* | 5/2017 | Choi | E04H 15/48 |
| D855,215 S | 7/2019 | Long | |
| D896,336 S | 9/2020 | Alemdar | |
| 2007/0056618 A1* | 3/2007 | Prusmack | E04H 1/1272 135/120.3 |
| 2007/0125033 A1* | 6/2007 | Stephan | E04B 1/32 52/655.1 |
| 2015/0101645 A1* | 4/2015 | Neville | A01G 9/16 135/125 |
| 2019/0106876 A1 | 4/2019 | Barton | |

OTHER PUBLICATIONS

"Elongated dome design," Geo-Dome, Retrieved from the Internet: <URL:https://geo-dome.co.uk/article.asp?uname=tunnel_dome>, Oct. 12, 2008, 2 pages.

"Zip Tie Tunnel Domes," Zip Tie Domes, Youtube, Retrieved from the Internet: <URL:https://www.youtube.com/watch?v=l4b_ZpnVno>, Nov. 3, 2013, 1 page.

Frank, "How to calculate strut angles," Geo-Dome, Retrieved from the Internet: <URL:https://geo-dome.co.uk/forum/article.asp?unmae=292, Jan. 29, 2009, 4 pages.

"Budapest Underground Line M4—Bikas Park Station/Palatium Studio," ArchDaily, Accessed Sep. 2, 2021, Retrieved from the Internet: <URL:https://www.archdaily.com/559278/budapes-underground-line-m4-bikas-park-station-palatium-studio>, Oct. 31, 2014, 3 pages.

"Dinosaur Theme Park Entrance Building/rimpf Architektur," ArchDaily, Accessed Sep. 2, 2021, Retrieved from the Internet: <URL:https://www.archdaily.com/871475/dinosaur-them-park-entrance-building-rimpf-architektur>, May 18, 2017, 9 pages.

"The Vivadome," Precision Grow Systems, Facebook, Retrieved from the Internet: <URL:https://www.facebook.com/precisiongrowsystems/photos/the-vivadome-a-complete-living-and-growing-environment-turning-the-desert-into-y/1082054278503-681/>, Mar. 11, 2016, 2 pages.

\* cited by examiner

| | | STRUT LENGTH | | | | |
|---|---|---|---|---|---|---|
| | | LINE PATTERN | GEODESIC LENGTH | | STRUT LENGTH (GEODESIC -10") | |
| | | | FEET | FEET/INCHES | FEET | FEET/INCHES |
| BS | Base Strut | ———— | 6.25 | 6'-3" | 5.42 | 5'-5" |
| BV | Base Vertical | — — — — | 3.92 | 3'-11" | 3.09 | 3'-1" |
| LP | Large Pentagon | ·········· | 7.82 | 7'-9 7/8" | 6.99 | 6'-11 7/8" |
| PS | Pentagon Spokes | | 6.33 | 6'-4" | 5.50 | 5'-6" |
| PE | Pentagon Edges | —··—··— | 7.38 | 7'-4 1/2" | 6.55 | 6'-6 1/2" |
| PC | Pentagon Connectors | ———— | 7.46 | 7'-5 1/2" | 6.63 | 6'-7 1/2" |
| MT | Mid Triangle | ———— | 8.12 | 8'-1 1/2" | 7.29 | 7'-3 1/2" |
| D1 | | | 6.71 | 6'-8 1/2" | 5.88 | 5'-10 1/2" |
| D2 | | | 6.35 | 6'-4 1/4" | 5.52 | 5'-6 1/4" |
| D3 | | | 6.75 | 6'-9" | 5.92 | 5'-11" |
| D4 | | | 1.68 | 1'-8 1/8" | 0.85 | 0'-10 1/8" |
| D5 | | | 5.45 | 5'-5 3/8" | 4.62 | 4'-7 3/8" |
| D6 | | | 4.20 | 4'-2 3/8" | 3.37 | 3'-4 3/8" |
| D7 | | | 2.40 | 2'-4 3/4" | 1.57 | 1'-6 3/4" |
| D8 | | | 5.40 | 5'-4 3/4" | 4.57 | 4'-6 3/4" |
| D9 | | | 3.89 | 3'-10 5/8" | 3.06 | 3'-0 5/8" |
| D10 | | | 7.72 | 7'-8 5/8" | 6.89 | 6'-10 5/8" |
| D11 | | | 7.05 | 7'-0 5/8" | 6.22 | 6'-2 5/8" |
| D12 | | | 7.91 | 7'-10 7/8" | 7.08 | 7'-1" |
| D13 | | | 6.00 | 6'-0" | 5.17 | 5'-2" |
| D14 | | | 5.90 | 5'-10 3/4" | 5.07 | 5'-0 3/4" |
| D15 | | | 4.23 | 4'-2 1/4" | 3.40 | 3'-4 3/4" |
| D16 | | | 2.65 | 2'-7 3/4" | 1.82 | 1'-9 3/4" |
| D17 | | | 2.04 | 2'-0 1/2" | 1.21 | 1'-2 1/2" |
| D18 | | | 6.33 | 6'-4" | 5.50 | 5'-6" |
| D19 | | | 6.33 | 6'-4" | 5.50 | 5'-6" |
| D20 | | | 6.33 | 6'-4" | 5.50 | 5'-6" |

SYSTEM USING STRUTS AND HUBS FOR AN ELONGATED GEODESIC DOME WITH AN ARCHED-TUNNEL SECTION

CROSS REFERENCE TO RELATED APPLICATIONS

This application is a continuation-in-part of U.S. Design patent application Ser. No. 29/695,654 filed on Jun. 20, 2019 and titled "Geodesic Dome." This application also claims the domestic benefit of U.S. Provisional Patent Application Ser. No. 62/864,321 filed on Jun. 20, 2019 and titled "System Using Struts and Hubs for an Elongated Geodesic Dome with an Arched-Tunnel Section." All of the aforementioned disclosures are hereby incorporated by reference in their entireties for all purposes.

FIELD OF TECHNOLOGY

Embodiments of the present disclosure are directed to an elongated geodesic dome system, and more particularly, an elongated geodesic dome with an arched-tunnel section. In various embodiments the elongated geodesic dome with an arched-tunnel section system comprises a hub and tubular strut system to form a plurality of geodesic triangles.

SUMMARY

According to some embodiments, the present technology is directed to an elongated geodesic dome with an arched-tunnel section, comprising: (a) a first adjustable angle hub connector, the first adjustable angle hub connector being a connector of a first plurality of tubular struts, the first plurality of tubular struts being inserted into the first adjustable angle hub connector; (b) a second adjustable angle hub connector, the second adjustable angle hub connector being a connector of a second plurality of tubular struts, the second plurality of tubular struts being inserted into the second adjustable angle hub connector; (c) a third adjustable angle hub connector, the third adjustable angle hub connector being a connector of a third plurality of tubular struts, the third plurality of tubular struts being inserted into the third adjustable angle hub connector.

In various embodiments the first adjustable angle hub connector, the second adjustable angle hub connector, and the third adjustable angle hub connector are removable to allow for adjusting a length of the arched-tunnel section of the elongated geodesic dome.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DESCRIPTION OF EXEMPLARY EMBODIMENTS

Embodiments of the present disclosure are directed an elongated geodesic dome system, and more particularly, an elongated geodesic dome with an arched-tunnel section. In various embodiments the elongated geodesic dome with an arched-tunnel section system comprises hubs connected with tubular struts.

While this technology is susceptible of embodiments in many different forms, there is shown in the drawings and has been described in detail several specific embodiments with the understanding that the present disclosure is to be considered as an exemplification of the principles of the technology and is not intended to limit the technology to the embodiments illustrated.

In various embodiments the elongated geodesic dome system of the present technology may be used as a greenhouse to control the growing of plants inside the elongated geodesic dome. For example, the elongated geodesic dome system may increase operational efficiency and crop quality of plants grown using the elongated geodesic dome system.

Furthermore, the elongated geodesic dome system may provide a controlled environment for the multiple factors for growing plants. Furthermore, the geodesic dome system may have rigidity to withstand the harsh environmental conditions including an earthquake. In some instances, the elongated geodesic dome system may be constructed quickly using a hub and tubular strut system. In some instances, the geodesic dome system have reduced energy, maintenance, and water costs compared to other systems that do not include the features described herein. For example, the geodesic dome system described herein may have 25 percent or more lower energy costs compared to similar systems that do not include the same features. In some embodiments the elongated geodesic dome system keeps insects outside of the system to keep the insects away from the plants on the inside that avoids the use of pesticides when growing plants.

In various embodiments the present technology comprises an elongated geodesic dome divided and lengthened using an arched-tunnel section. In some instances, the elongated geodesic dome comprises hubs connected with tubular struts. In some embodiments the hubs connected with tubular struts are made from aluminum. In various instances the system using hubs connected with tubular struts is covered with a reinforced polyethylene cover to form the elongated geodesic dome structure. The reinforced the polyethylene cover may be light transparent. In some embodiments the elongated geodesic dome comprises a light deprivation system to remove deprive light from inside the structure.

Figure 1:
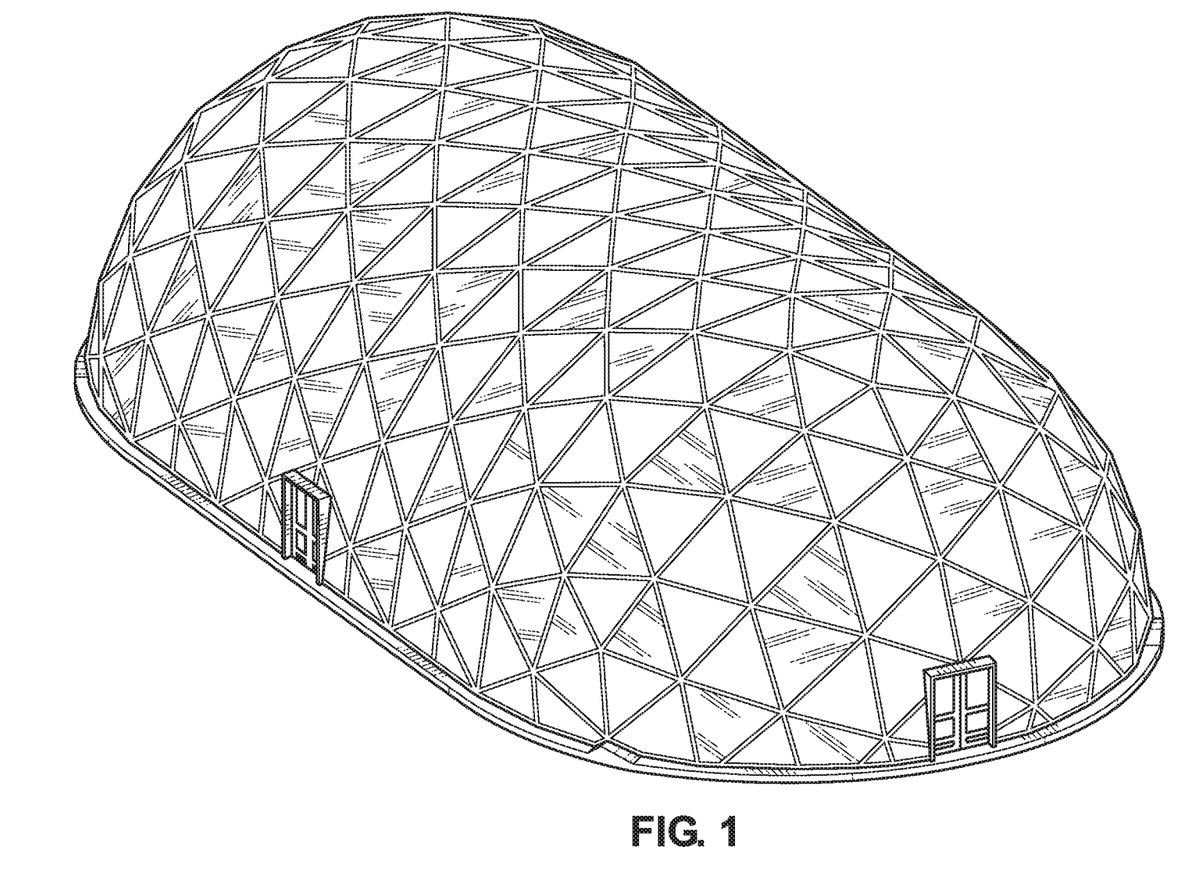
FIG. 1 is a perspective view of an elongated geodesic dome system according to various embodiments of the present technology.

FIG. 1 is a perspective view of an elongated geodesic dome system according to various embodiments of the present technology. FIG. 1 shows a front-end door and a right-side door of the elongated geodesic dome system. The front-end door and the right-side door may be used to enter and exit the elongated geodesic dome system.

Figure 2:
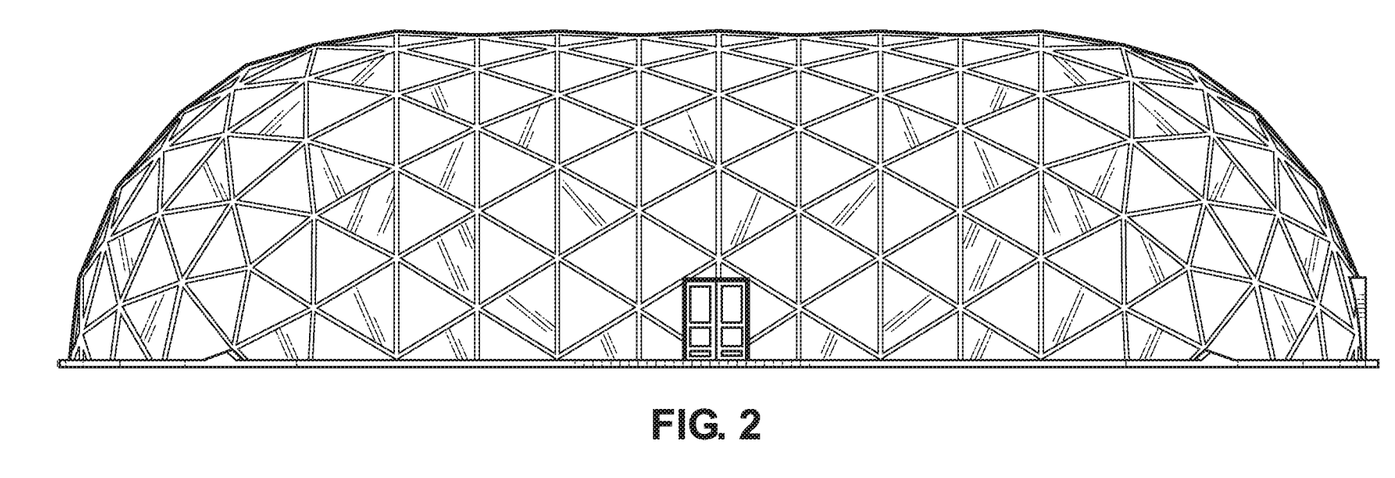
FIG. 2 is a right view of an elongated geodesic dome system according to various embodiments of the present technology.

FIG. 2 is a right view of an elongated geodesic dome system according to various embodiments of the present technology. FIG. 2 shows the right-side door of the elongated geodesic dome system. The right-side door may be used to enter and exit the elongated geodesic dome system. FIG. 2 further shows an arched-tunnel section of the elongated geodesic dome system from a right view.

Figure 3:
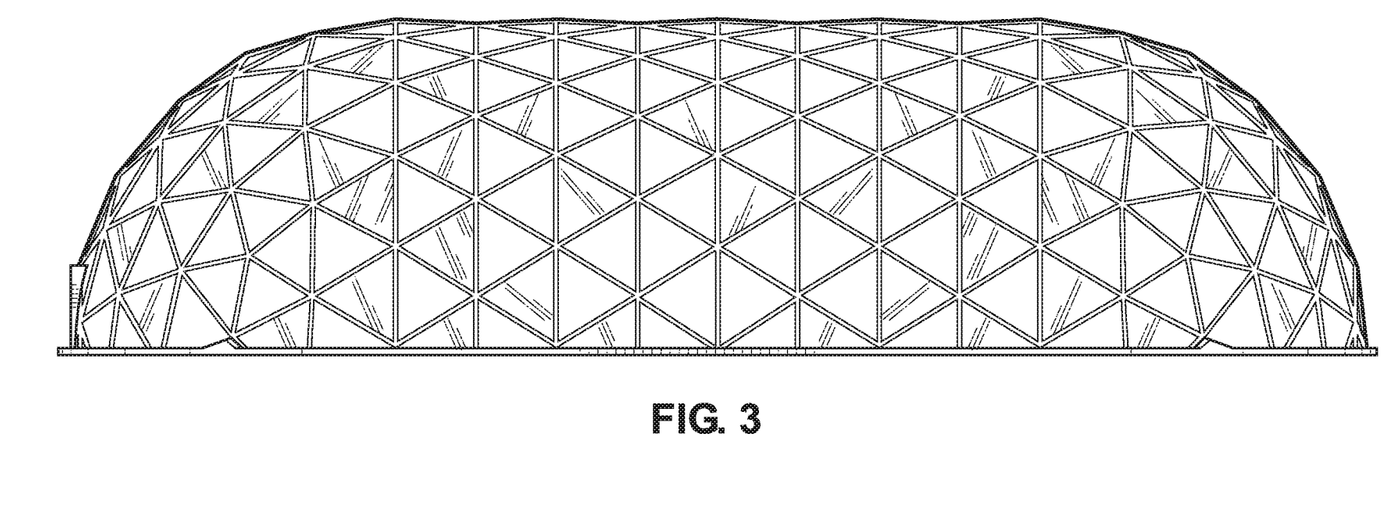
FIG. 3 is a left view of an elongated geodesic dome system according to various embodiments of the present technology.

FIG. 3 is a left view of an elongated geodesic dome system according to various embodiments of the present technology. FIG. 3 shows the arched-tunnel section of the elongated geodesic dome system from a left view.

Figure 4:
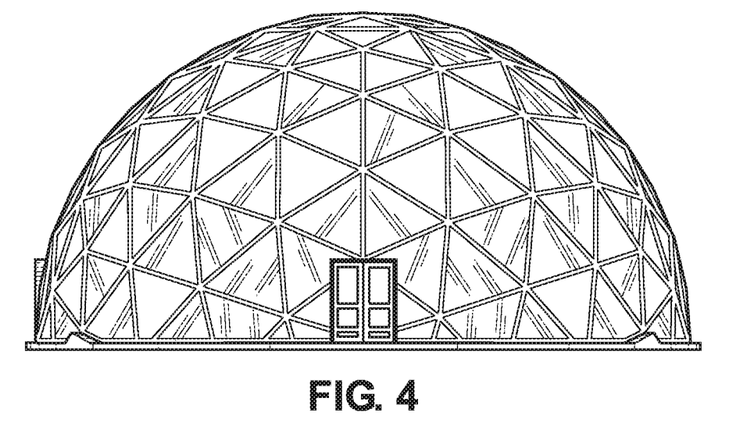
FIG. 4 is a front view of an elongated geodesic dome system according to various embodiments of the present technology.

FIG. 4 is a front view of an elongated geodesic dome system according to various embodiments of the present technology. FIG. 4 shows the front-end door of the elongated geodesic dome system. Again, the front-end door may be used to enter and exit the elongated geodesic dome system.

Figure 5:
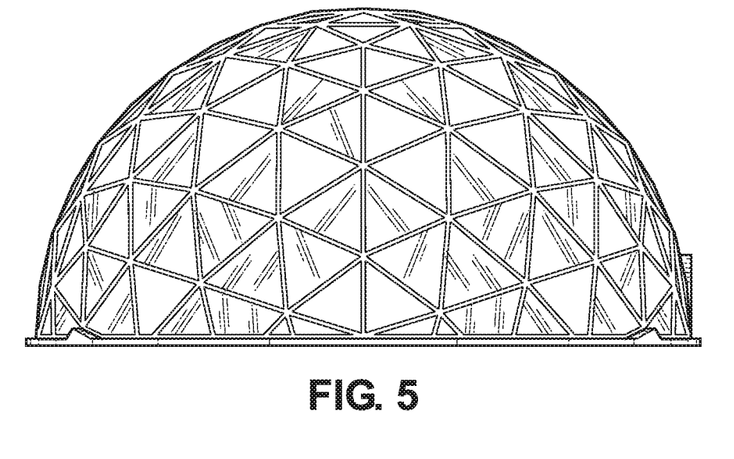
FIG. 5 is a back view of an elongated geodesic dome system according to various embodiments of the present technology.

FIG. 5 is a back view of an elongated geodesic dome system according to various embodiments of the present technology. No door is present from this back view.

Figure 6:
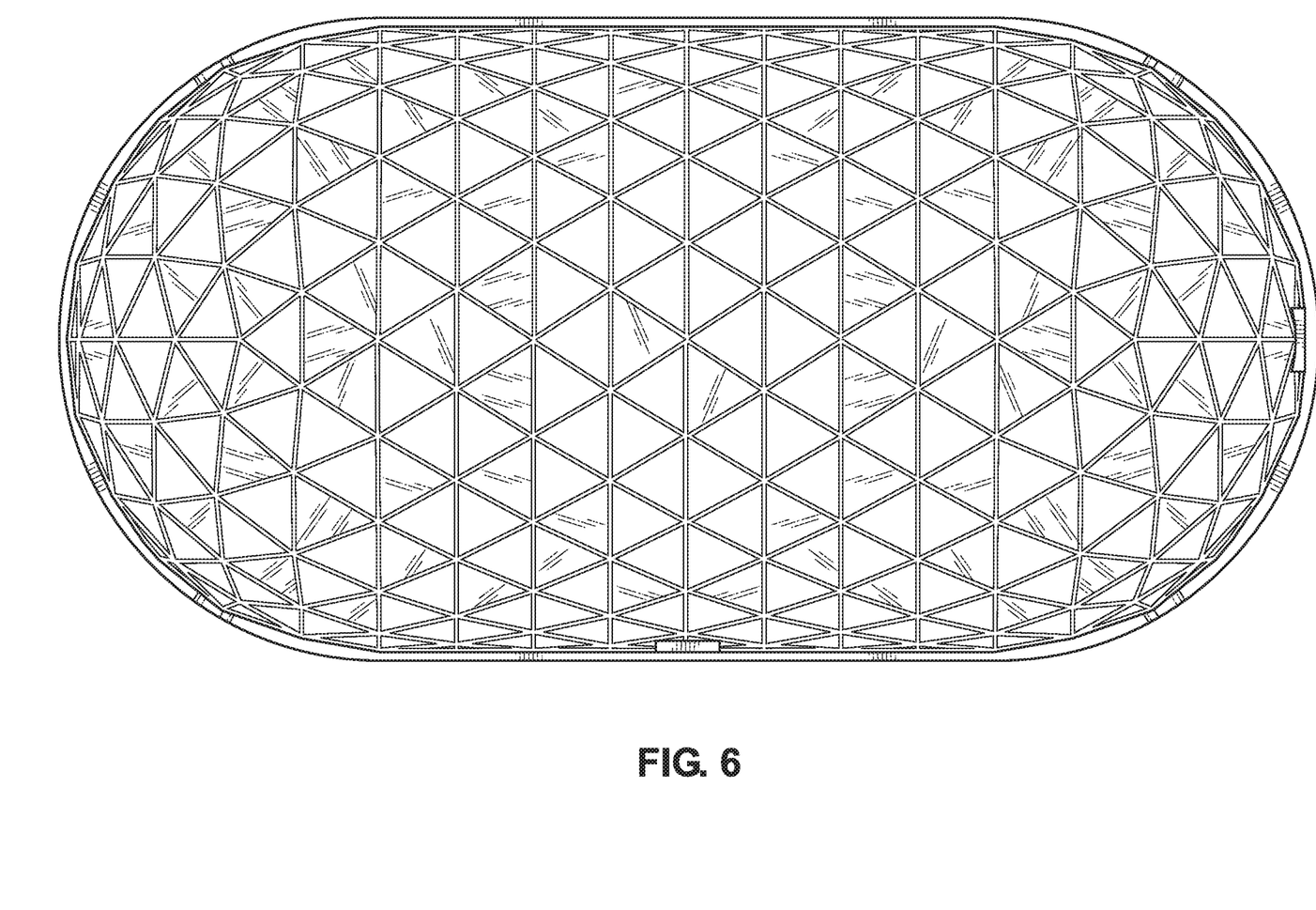
FIG. 6 is a top view of an elongated geodesic dome system according to various embodiments of the present technology.

FIG. 6 is a top view of an elongated geodesic dome system according to various embodiments of the present technology. FIG. 6 shows the arched-tunnel section of the elongated geodesic dome system from a top view.

Figure 7A:
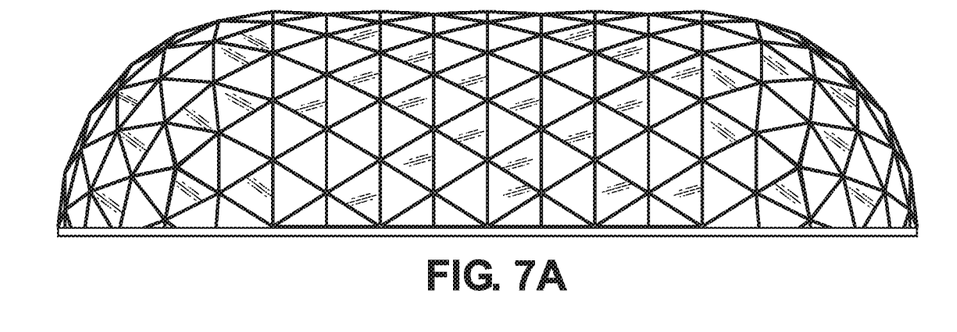
FIG. 7A though FIG. 7C are various views of an elongated geodesic dome system according to various embodiments of the present technology.
Figure 7B:
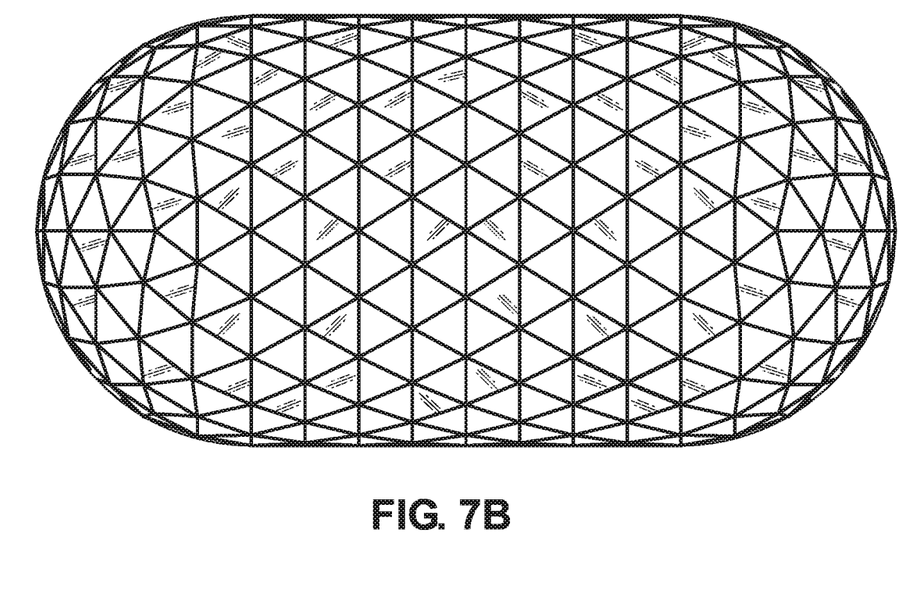
Figure 7C:
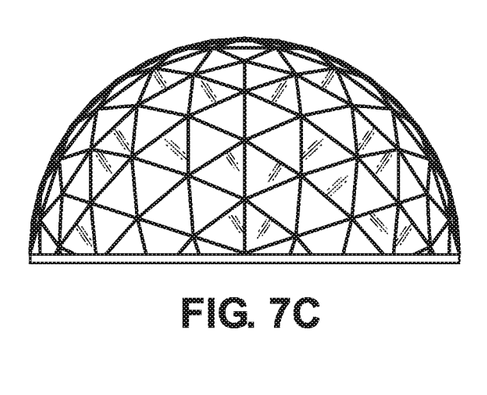

FIG. 7A though FIG. 7C are various views of an elongated geodesic dome system according to various embodiments of the present technology. FIG. 7A is a side elevation view, FIG. 7B a top view, and FIG. 7C an end elevation view of an elongated geodesic dome system according to various embodiments of the present technology. FIG. 7A shows a side elevation view including a finished grade and a foundation. FIG. 7B also shows a top view of an elongated geodesic dome system including the arched-tunnel section of the elongated geodesic dome system from a top view. FIG. 7C shows an end elevation view including the finished grade and the foundation.

Figure 8:
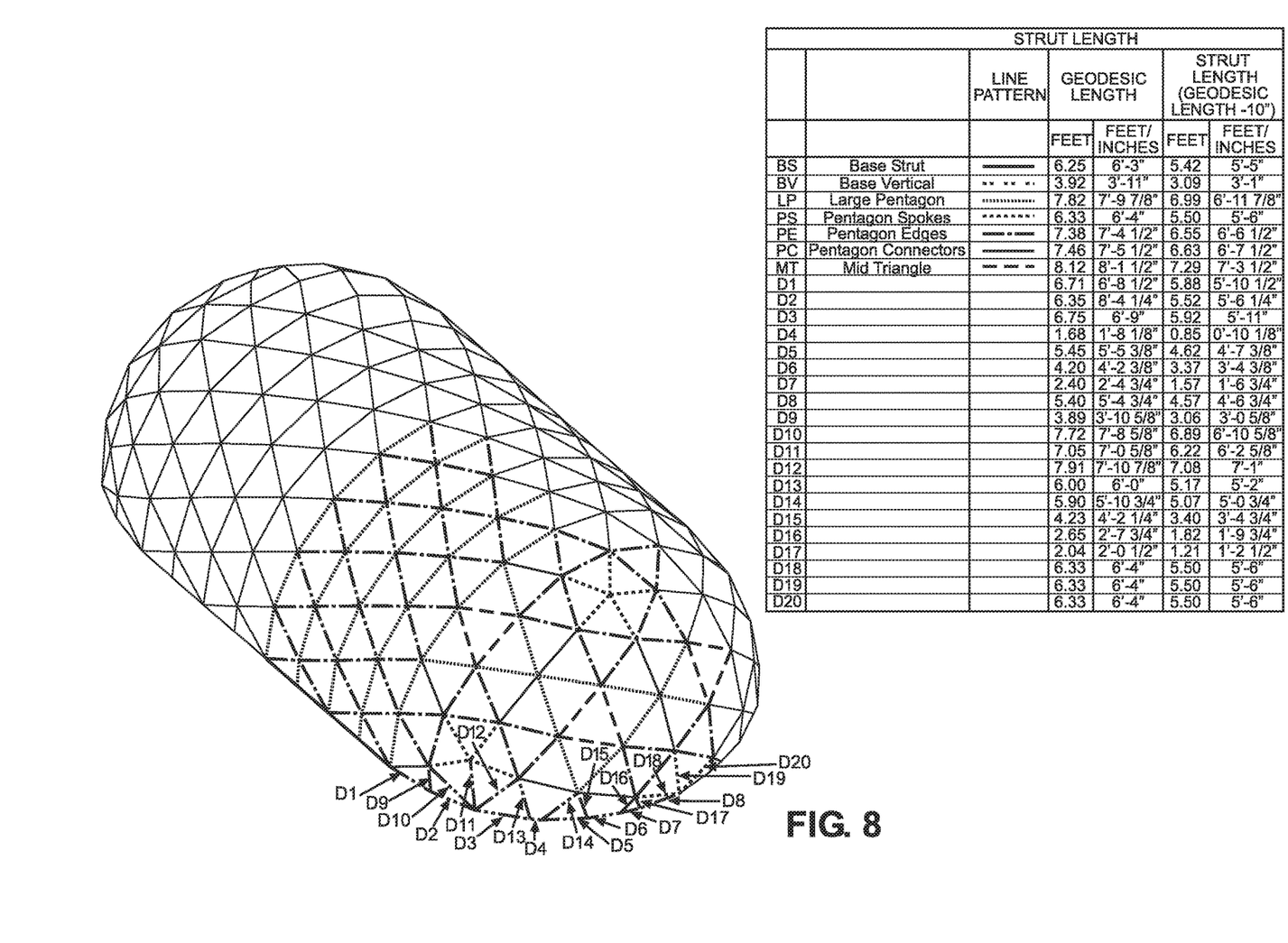
FIG. 8 is a perspective view including dimensions of various struts of an elongated geodesic dome system according to various embodiments of the present technology.

FIG. 8 is a perspective view including dimensions of various components of an elongated geodesic dome system. In various embodiments the elongated geodesic dome system comprises geodesic triangles as shown in FIG. 7A though FIG. 7C and FIG. 8. The geodesic triangles size may be various sizes. In some embodiments the struts are "human scale" that is approximately 6.5 feet long for ease of assembly by people for a geodesic dome with the following dimensions 50 feet wide by 100 feet long by 25 feet high. For example, a table of "strut length" showing dimensions of struts is shown in FIG. 8. For instance, exemplary dimensions of a base strut, a base vertical, a large pentagon, pentagon spokes, pentagon edges, pentagon connectors, and a mid-triangle are shown in FIG. 8. Furthermore, non-limiting, exemplary geodesic length and strut length for struts D1 through D20 are shown in the table in FIG. 8.

Figures 9A, 9C:
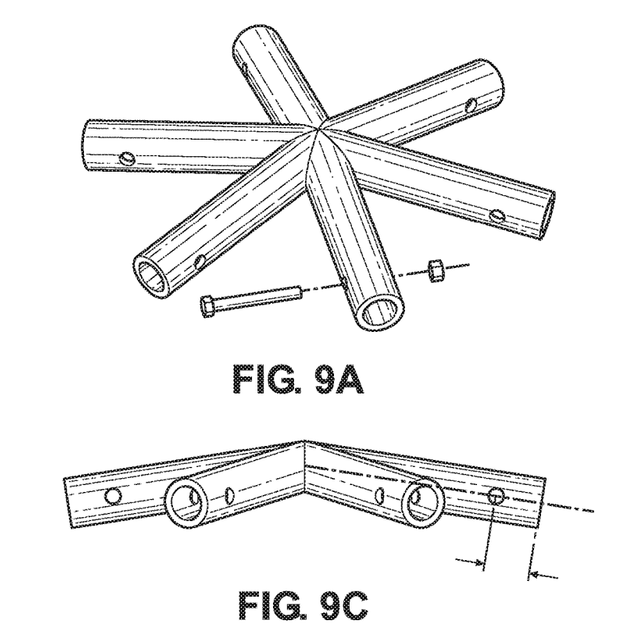
FIG. 9A through FIG. 9E show detailed views of an adjustable angle hub connector according to various embodiments of the present technology.
Figure 9B:
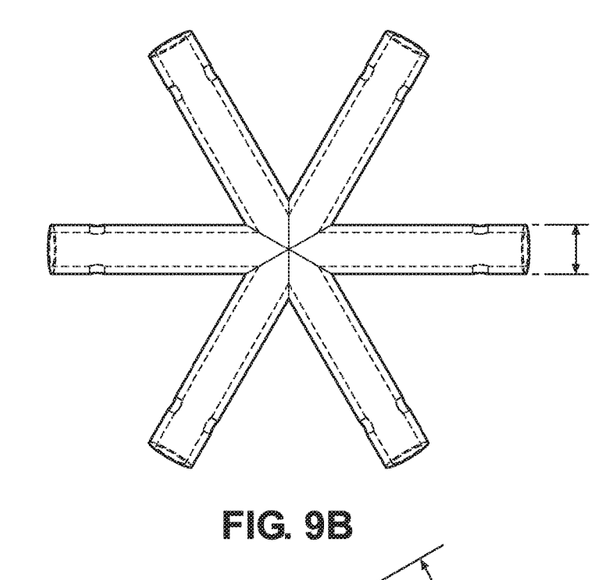
Figure 9D:
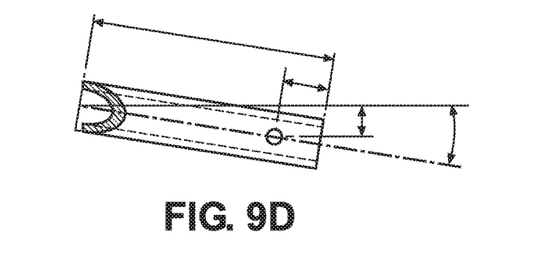
Figure 9E:
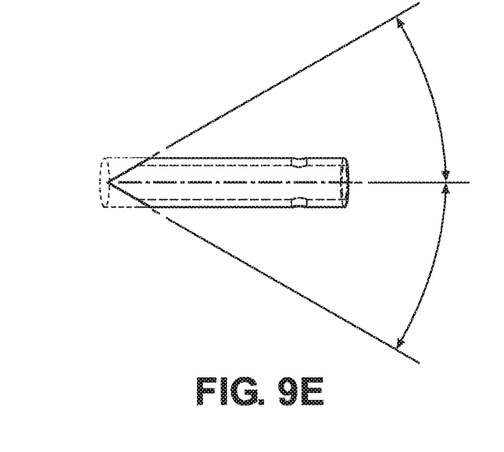

FIG. 9A through FIG. 9E show detailed views of an adjustable angle hub connector according to various embodiments of the present technology. FIG. 9A shows a perspective view, FIG. 9B shows a top view, and FIG. 9C shows a side view of an adjustable angle hub connector for forming geodesic triangles for support of an elongated geodesic dome system. In some embodiments, the adjustable angle hub connector may be a six-member adjustable angle hub connector for forming pentagons including pentagon spokes for the elongated geodesic dome system. FIG. 9D shows close-up of a pin plan section and FIG. 9E shows an angled pin section for connecting tubular struts to the adjustable angle hub connector, the tubular struts being pentagon spokes in some instances.

Figure 10A:
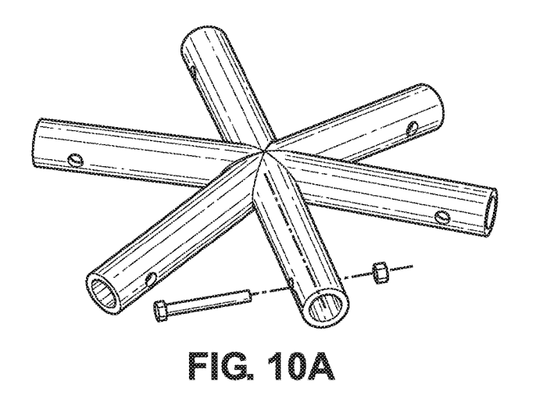
FIG. 10A through FIG. 10F show detailed views of an adjustable angle hub connector according to various embodiments of the present technology.
Figure 10B:
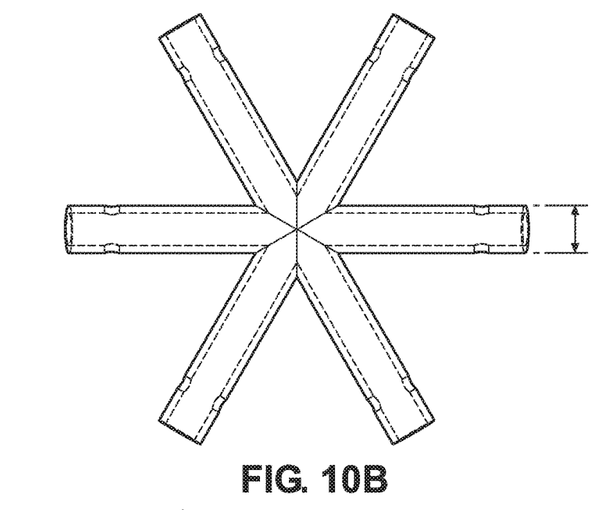
Figure 10C:
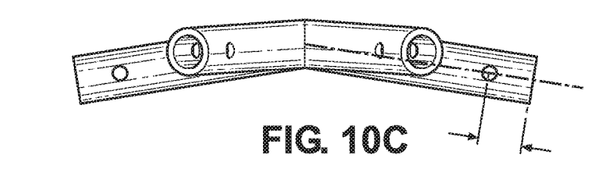
Figure 10D:
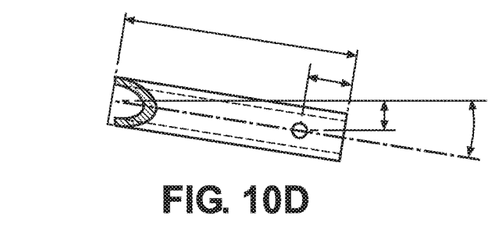
Figure 10E:
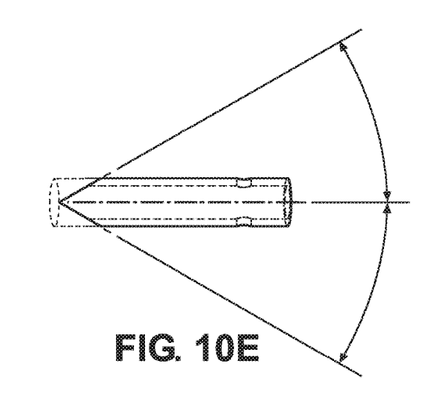
Figure 10F:
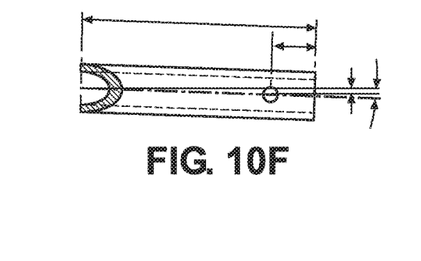

FIG. 10A through FIG. 10F show detailed views of an adjustable angle hub connector according to various embodiments of the present technology. FIG. 10A shows a perspective view, FIG. 10B shows a top view, and FIG. 10C shows a side view of an adjustable angle hub connector for forming geodesic triangles for support of an elongated geodesic dome system. In some embodiments, the adjustable angle hub connector may be a six-member adjustable angle hub connector for forming pentagons including pentagon spokes for the elongated geodesic dome system. FIG. 10D further shows close-up of a pin plan section and FIG. 10E and FIG. 10F show angled pin sections for connecting tubular struts to the adjustable angle hub connector, the tubular struts being pentagon spokes in various embodiments. The adjustable angle hub connector of FIG. 10A through FIG. 10F shows the hub connections for tubular struts at different angles compared with the adjustable angle hub connector of FIG. 9A through FIG. 9E demonstrating the adjustable angle functionality of adjustable angle hub connectors of the present technology. In some instances, adjusting the angle for connections with tubular struts of the adjustable angle hub connectors is used for assembling elongated geodesic domes of the present technology.

Figure 11A:
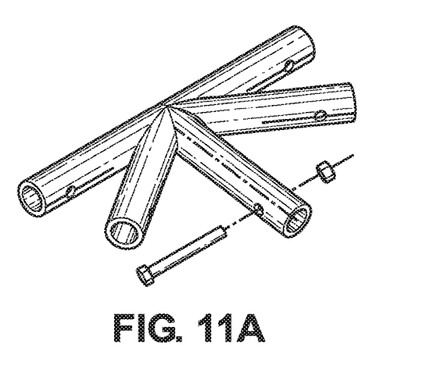
FIG. 11A though FIG. 11I show detailed views of an adjustable angle base hub connector for forming the base for support according to various embodiments of the present technology.
Figure 11B:
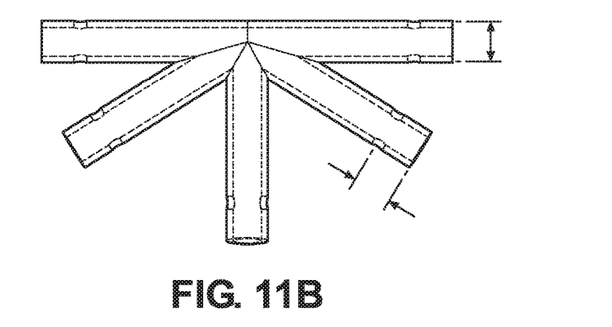
Figure 11C:
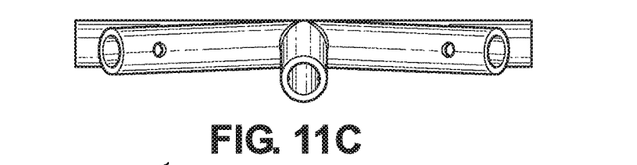
Figure 11D:
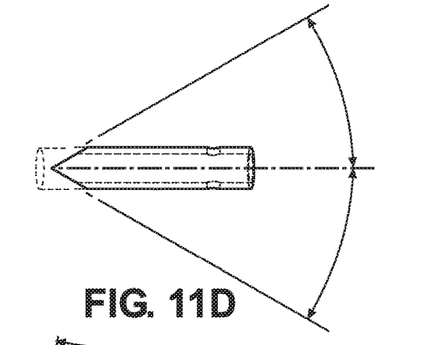
Figure 11E:
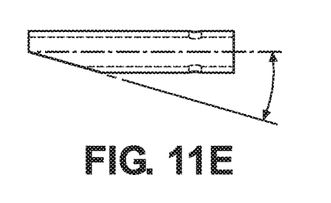
Figure 11F:
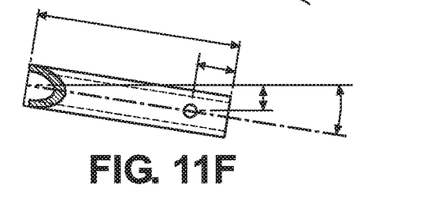
Figure 11G:
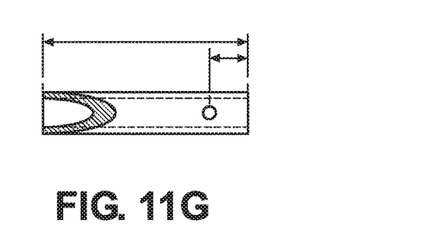
Figure 11H:
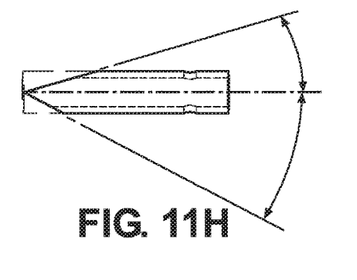
Figure 11I:
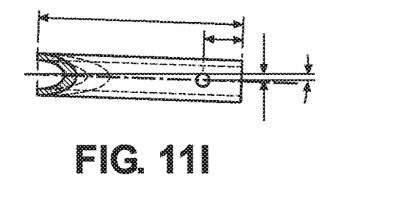

FIG. 11A though FIG. 11I show detailed views of an adjustable angle base hub connector for forming the base for support according to various embodiments of the present technology. FIG. 11A shows a perspective view, FIG. 11B shows a top view, and FIG. 11C shows a side view of the adjustable angle base hub connector for forming the base for support of an elongated geodesic dome system. In some embodiments, the adjustable angle hub connector may be a five-member adjustable angle base hub connector for base support for forming the elongated geodesic dome system. FIG. 11D though FIG. 11I show close-up of a pin plan section and angled pin sections for connecting tubular struts to the adjustable angle base hub connector, the tubular struts being base struts and pentagon edges. In some instances, adjusting the angle of the adjustable angle base hub connector for connection with base struts and struts for and pentagon edges is used for assembling elongated geodesic domes of the present technology.

Figure 12A:
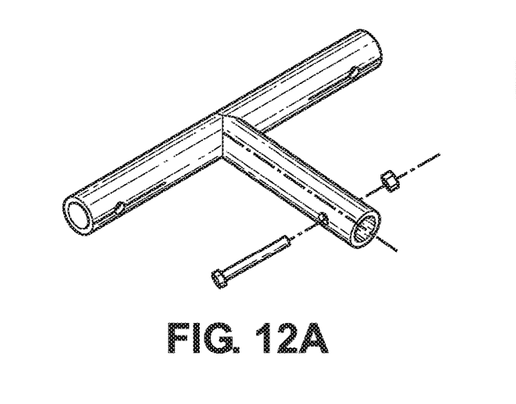
FIG. 12A though FIG. 12G show detailed views of an adjustable angle base hub connector for forming the base for support of an elongated geodesic dome system according to various embodiments of the present technology.
Figure 12B:
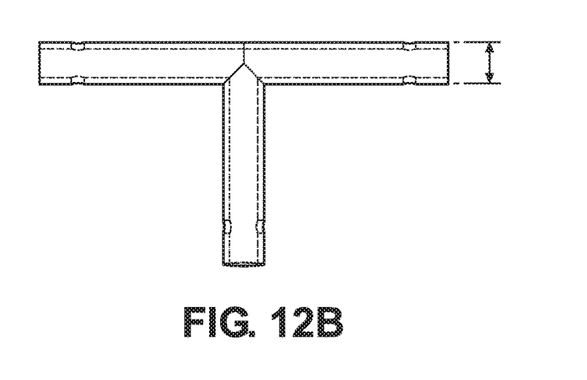
Figure 12C:
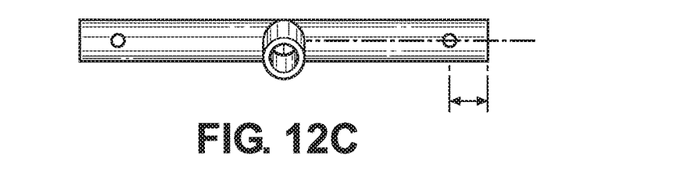
Figure 12D:
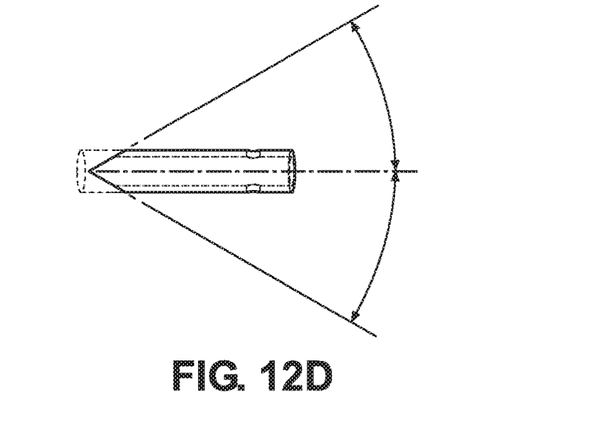
Figure 12E:
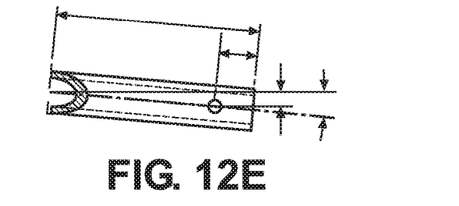
Figure 12F:
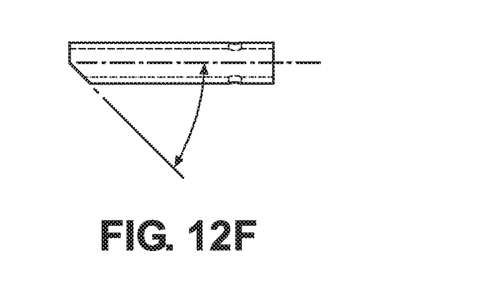
Figure 12G:
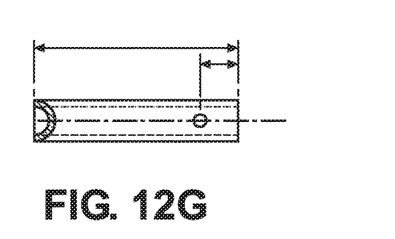

FIG. 12A though FIG. 12G show detailed views of an adjustable angle base hub connector for forming the base for support of an elongated geodesic dome system according to various embodiments of the present technology. FIG. 12A shows a perspective view, FIG. 12B shows a top view, and FIG. 12C shows a side view of the adjustable angle base hub connector for forming the base for support of an elongated geodesic dome system. In some embodiments, the adjustable angle hub connector may be a three-member adjustable angle base hub connector for base support for forming the elongated geodesic dome system. FIG. 12D through FIG. 12G further shows close-up of a pin plan section and angled pin sections for connecting tubular struts to the adjustable angle base hub connector, the tubular struts being base struts and pentagon edges. In some instances, adjusting the angle of the adjustable angle base hub connector for connection with base struts and struts for pentagon edges is used for assembling elongated geodesic domes of the present technology.

Figure 13A:
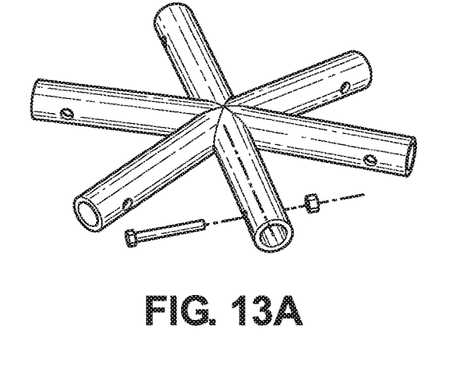
FIG. 13A though FIG. 13G show detailed views of an adjustable angle hub connector according to various embodiments of the present technology.
Figure 13B:
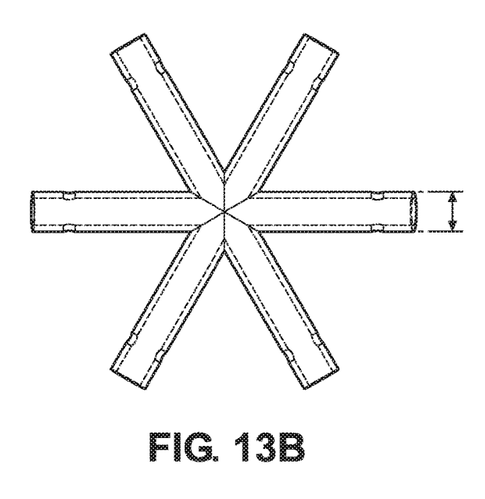
Figure 13C:
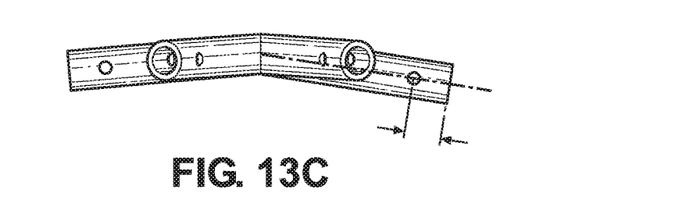
Figure 13D:
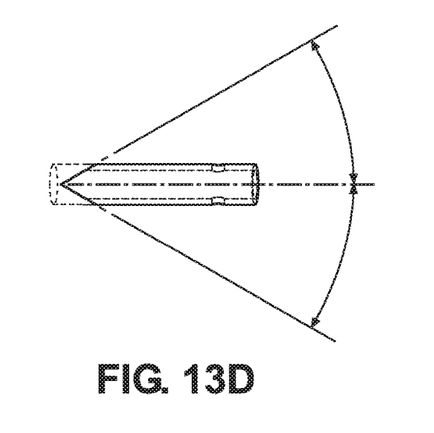
Figure 13E:
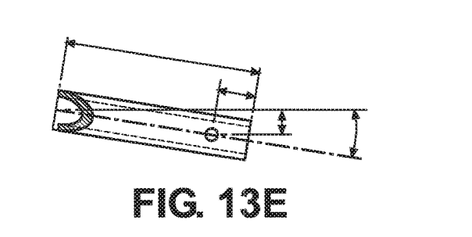
Figure 13F:
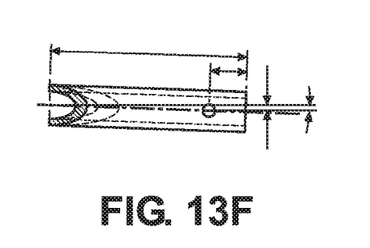
Figure 13G:
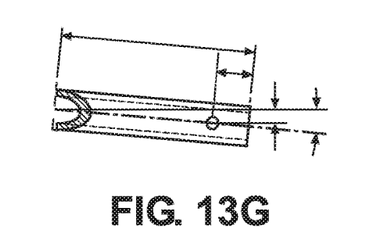

FIG. 13A though FIG. 13G show detailed views of an adjustable angle hub connector according to various embodiments of the present technology. FIG. 13A shows a perspective view, FIG. 13B shows a top view, and FIG. 13C shows a side view of an adjustable angle hub connector for forming geodesic triangles of an elongated geodesic dome system. In some embodiments, the adjustable angle hub connector may be a six-member adjustable angle hub connector for forming pentagons including pentagon spokes for the elongated geodesic dome system. FIG. 13D through FIG. 13G further show a close-up of a pin plan section and angled pin sections for connecting tubular struts to the adjustable angle hub connector, the tubular struts being pentagon spokes in some embodiments. The adjustable angle hub connector of FIG. 13A though FIG. 13G shows the hub connections for tubular struts at different angles compared with the adjustable angle hub connector of FIG. 9A through FIG. 9E and the adjustable angle hub connector of FIG. 10A through FIG. 10F demonstrating the adjustable angle functionality of adjustable angle hub connectors of the present technology. In some instances, adjusting the angle for connections with tubular struts of the adjustable angle hub connectors is used for assembling elongated geodesic domes of the present technology.

Figures 14A, 14B:
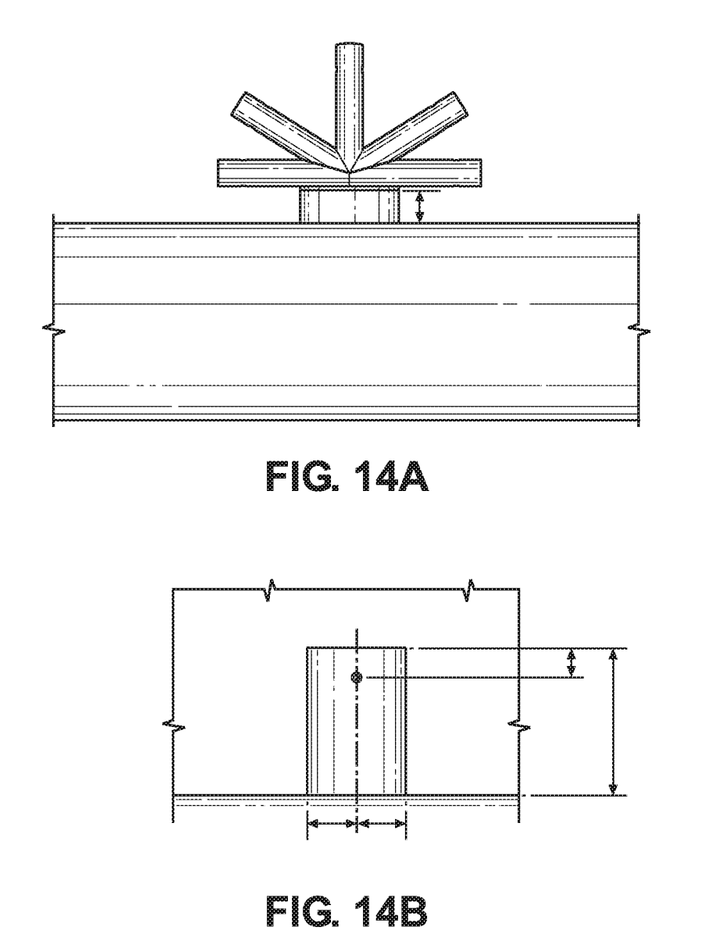
FIG. 14A through FIG. 14C show detailed views of an adjustable angle base hub connector on a foundation according to various embodiments of the present technology.
Figure 14C:
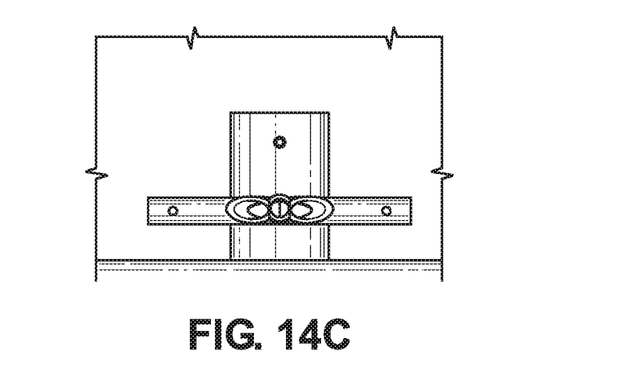

FIG. 14A through FIG. 14C show detailed views of an adjustable angle base hub connector on a foundation according to various embodiments of the present technology. FIG. 14A shows a side view of the adjustable angle base hub connector connected to a precast concrete pedestal of a foundation for support of an elongated geodesic dome system. In some embodiments, the adjustable angle hub connector may be a five-member adjustable angle base hub connector for base support for forming the elongated geodesic dome system as shown in FIG. 11A though FIG. 11I. FIG. 14B shows a side view of a precast concrete pedestal of a foundation for support of an elongated geodesic dome system. FIG. 14C shows a top view of the adjustable angle base hub connector connected to a precast concrete pedestal of a foundation for support of an elongated geodesic dome system. In some instances, the precast concrete pedestal of the foundation for the base for support of an elongated geodesic dome system includes a hole for connection of the adjustable angle base hub connector.

In various embodiments the tubular struts and hubs of the elongated geodesic dome comprise hub configurations as shown in FIG. 9A through FIG. 9E, FIG. 10A through FIG. 10F, FIG. 11A though FIG. 11I, FIG. 12A though FIG. 12G, FIG. 13A though FIG. 13G, and FIG. 14A through FIG. 14C described herein. The hub configurations are exemplary and other configurations are contemplated in various embodiments of the present technology. In some embodiments dimensions of the hubs are: 1⅝-inch diameter, by ⅛-inch wall thickness, by 8-inches long. Furthermore, is some embodiments the hubs are tubular aluminum and are welded together to form spokes of the hub. The hub is a connector for the tubular struts. In some instances, ½-inch diameter holes are drilled in a location 1½ inches from the hub for pin ends used for bolts connecting the tubular strut to the hub. The exemplary dimensions described herein between the tubular strut and hub bolt hole and the connection at the hub pins, allows for the tubular struts to be inserted and removed into the hubs. For example, the tubular struts may be inserted and removed into the hubs by sliding one end of a tubular strut all the way to the hub pin connection and then inserting the opposite end over the hub pin while sliding the tubular strut into position. In various instances the hub configuration accommodates an angle change at the various hub locations allowing for an adjustable angle hub. In some embodiments the tubular struts and hubs are light weight so the tubular struts and hubs can be carried by a human for easy installation. For example, hubs may weight approximately 2.5 pounds each and tubular struts may weight approximately 6 pounds each. In some instances, the tubular struts and hubs are materially efficient.

In various embodiments the tubular struts and hubs of the elongated geodesic dome are designed for ease of field modification and fabrication. For example, for a hub, field angle change modifications may be made by cutting a small notch on the compression side, then heating the tension side, and bending the pin to a required angle. In various instances tubular struts are easily field fabricated or modified by cutting the tubular struts to a length of a drilling bolt hole. In some instances, all components of the hub and tubular strut system are easily modified in the field using standard field tools and equipment.

In some embodiments an elongated geodesic dome system of the present technology comprises a foundation. In some instances, the foundation is a concrete foundation. For example, the concrete foundation may be a concrete slab including, trench footing, small bearing pads, and the like.

In various embodiments an elongated geodesic dome of the present technology comprises an arched-tunnel section. In some instances, the arched-tunnel section is lengthened to change the dimensions of the elongated geodesic dome. Furthermore, the arched tunnel section may be strengthened using steel cables tightened with turnbuckles in response to certain load conditions.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three-dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. An elongated geodesic dome system including an adjustable arched-tunnel section, the system comprising:
   a first adjustable angle hub connector, the first adjustable angle hub connector being a connector of a first plurality of tubular struts, the first plurality of tubular struts being inserted into the first adjustable angle hub connector;
   a second adjustable angle hub connector, the second adjustable angle hub connector being a connector of a second plurality of tubular struts, the second plurality of tubular struts being inserted into the second adjustable angle hub connector;
   a third adjustable angle hub connector, the third adjustable angle hub connector being a connector of a third plurality of tubular struts, the third plurality of tubular struts being inserted into the third adjustable angle hub connector; and
   further comprising removing the first adjustable angle hub connector, the second adjustable angle hub connector, and the third adjustable angle hub connector, and adjusting a length of the arched-tunnel section of the elongated geodesic dome.

2. The system of claim 1, wherein the first adjustable angle hub connector forms a geodesic triangle of the elongated geodesic dome system.

3. The system of claim 2, wherein the first adjustable angle hub connector is a six-member adjustable angle hub connector; and wherein the first plurality of tubular struts comprises six tubular struts forming a pentagon of the elongated geodesic dome.

4. The system of claim 3, wherein the first plurality of tubular struts form spokes of the pentagon of the elongated geodesic dome.

5. The system of claim 1, wherein the second adjustable angle hub connector is an adjustable angle base hub connector.

6. The system of claim 5, wherein the adjustable angle base hub connector is a five-member adjustable angle hub connector; and wherein the second plurality of tubular struts comprises five tubular struts comprising base support for the elongated geodesic dome.

7. The system of claim 6, wherein the second plurality of tubular struts comprise base struts and pentagon spokes.

8. The system of claim 6, wherein the adjustable angle base hub connector is connected to a precast concrete pedestal of a foundation of the elongated geodesic dome system.

9. The system of claim 8, wherein the foundation of the elongated geodesic dome system comprises a bottom footing; and wherein the precast concrete pedestal comprises a hole for connection with the adjustable angle base hub connector.

10. The system of claim 1, wherein the third adjustable angle hub connector is a third adjustable angle base hub connector.

11. The system of claim 10, wherein the third adjustable angle base hub connector is a three-member adjustable angle hub connector; and wherein the third plurality of tubular struts comprises three tubular struts comprising a base support for the elongated geodesic dome.

12. The system of claim 11, wherein the third plurality of tubular struts comprise base struts.

13. The system of claim 12, wherein the third adjustable angle base hub connector is connected to a precast concrete pedestal of a foundation of the elongated geodesic dome system.

14. The system of claim 1, further comprising a reinforced polyethylene cover, the reinforced polyethylene cover covering the elongated geodesic dome system and being transparent to light.

15. The system of claim 1, further comprising a door, the door being used for entry and exit of the elongated geodesic dome system.

16. The system of claim 1, wherein the first plurality of tubular struts inserted into the first adjustable angle hub connector are secured using threaded bolts inserted into holes in the first adjustable angle hub connector.

17. The system of claim 1, wherein the second plurality of tubular struts inserted into the second adjustable angle hub connector are secured using threaded bolts inserted into holes in the second adjustable angle hub connector.

18. The system of claim 1, wherein the third plurality of tubular struts inserted into the third adjustable angle hub connector are secured using threaded bolts inserted into holes in the third adjustable angle hub connector.

19. An elongated geodesic dome system including an adjustable arched-tunnel section, the system comprising:

a first adjustable angle hub connector, the first adjustable angle hub connector being a connector of a first plurality of tubular struts, the first plurality of tubular struts being inserted into the first adjustable angle hub connector;
wherein the first adjustable angle hub connector forms a geodesic triangle of the elongated geodesic dome system;
wherein the first adjustable angle hub connector is a six-member adjustable angle hub connector;
wherein the first plurality of tubular struts comprises six tubular struts forming a pentagon of the elongated geodesic dome;
a second adjustable angle hub connector, the second adjustable angle hub connector being a connector of a second plurality of tubular struts, the second plurality of tubular struts being inserted into the second adjustable angle hub connector;
a third adjustable angle hub connector, the third adjustable angle hub connector being a connector of a third plurality of tubular struts, the third plurality of tubular struts being inserted into the third adjustable angle hub connector; and
further comprising removing the first adjustable angle hub connector, the second adjustable angle hub connector, and the third adjustable angle hub connector, and adjusting a length of the arched-tunnel section of the elongated geodesic dome.

20. An elongated geodesic dome system including an adjustable arched-tunnel section, the system comprising:

a first adjustable angle hub connector, the first adjustable angle hub connector being a connector of a first plurality of tubular struts, the first plurality of tubular struts being inserted into the first adjustable angle hub connector;
a second adjustable angle hub connector, the second adjustable angle hub connector being a connector of a second plurality of tubular struts, the second plurality of tubular struts being inserted into the second adjustable angle hub connector;
wherein the second adjustable angle hub connector is an adjustable angle base hub connector;
wherein the adjustable angle base hub connector is a five-member adjustable angle hub connector;
wherein the second plurality of tubular struts comprises five tubular struts comprising a base support for the elongated geodesic dome;
wherein the second plurality of tubular struts comprise base struts and pentagon spokes;
a third adjustable angle hub connector, the third adjustable angle hub connector being a connector of a third plurality of tubular struts, the third plurality of tubular struts being inserted into the third adjustable angle hub connector; and
further comprising removing the first adjustable angle hub connector, the second adjustable angle hub connector, and the third adjustable angle hub connector, and adjusting a length of the arched-tunnel section of the elongated geodesic dome.

* * * * *